US012756125B2

(12) United States Patent
Yuan et al.

(10) Patent No.: US 12,756,125 B2
(45) Date of Patent: Oct. 6, 2026

(54) CONNECTOR TERMINAL AND CONNECTOR

(71) Applicants: SIBAS Electronics (Xiamen) Co. Ltd., Xiamen City (CN); Tyco Electronics (Shanghai) Co., Ltd., Shanghai (CN)

(72) Inventors: Qiang Yuan, Xiamen (CN); Liqiang (Gino) Yao, Shanghai (CN); Yong (Chris) Wang, Shanghai (CN); Lei Wang, Xiamen (CN); Renzhong (Andy) Lin, Xiamen (CN)

(73) Assignees: Tyco Electronics (Shanghai) Co., Ltd., Shanghai (CN); SIBAS Electronics (Xiamen) Co., Ltd., Xiamen City (CN)

( * ) Notice: Subject to any disclaimer, the term of this patent is extended or adjusted under 35 U.S.C. 154(b) by 394 days.

(21) Appl. No.: 18/584,315

(22) Filed: Feb. 22, 2024

(65) Prior Publication Data

US 2024/0291191 A1 Aug. 29, 2024

(30) Foreign Application Priority Data

Feb. 24, 2023 (CN) ......................... 202320306732.8

(51) Int. Cl.

| | |
|---|---|
| ***H01R 13/424*** | (2006.01) |
| ***H01R 4/18*** | (2006.01) |
| ***H01R 13/11*** | (2006.01) |
| ***H01R 13/187*** | (2006.01) |

(52) U.S. Cl.

CPC ........... *H01R 13/424* (2013.01); *H01R 4/184* (2013.01); *H01R 13/111* (2013.01); *H01R 13/187* (2013.01)

(58) Field of Classification Search

None

See application file for complete search history.

(56) References Cited

U.S. PATENT DOCUMENTS

| | | | | |
|---|---|---|---|---|
| 2014/0038473 | A1* | 2/2014 | Kojima | H01R 13/111 439/851 |
| 2019/0074650 | A1* | 3/2019 | Huang | H01R 13/11 |
| 2021/0399456 | A1* | 12/2021 | Brand | H01R 13/111 |
| 2024/0291192 | A1* | 8/2024 | Yuan | H01R 4/185 |
| 2025/0118907 | A1* | 4/2025 | Nehm | H01R 4/184 |

* cited by examiner

*Primary Examiner* — Oscar C Jimenez

(74) *Attorney, Agent, or Firm* — Barley Snyder

(57) ABSTRACT

A connector terminal includes a terminal body having a hollow cylindrical part and a plurality of protrusions formed on the hollow cylindrical part, and a supporting component installed on the hollow cylindrical part of the terminal body. The supporting component includes a first circumferential wall, a second circumferential wall coaxial with the first circumferential wall and having a diameter smaller than a diameter of the first circumferential wall, a radial wall radially connected between the first circumferential wall and the second circumferential wall, and a flanging part vertically bent inward from the second circumferential wall. The protrusions are constrained between the first circumferential wall, the radial wall, and the flanging part. The radial wall forms a support step.

18 Claims, 6 Drawing Sheets

CONNECTOR TERMINAL AND CONNECTOR

CROSS-REFERENCE TO RELATED APPLICATION

This application claims the benefit of the filing date under 35 U.S.C. § 119(a)-(d) of Chinese Patent Application No. 202320306732.8, filed on Feb. 24, 2023.

FIELD OF THE INVENTION

The present invention relates to a connector terminal and a connector comprising the connector terminal.

BACKGROUND

A heavy-duty connector typically includes a housing, a terminal, and an elastic locking piece. The terminal is inserted into the housing. In the prior art, a radial flange is formed on the peripheral wall of the terminal body by stamping. The elastic locking piece is fixed in the housing and pressed against the radial flange of the terminal to lock the terminal in the housing, thereby effectively preventing the terminal from being pulled out of the housing.

However, in the prior art, due to the need to punch a circle of radial flange on the peripheral wall of the terminal body, the wall thickness of the radial flange of the terminal is relatively thin, seriously affecting the conductivity of the terminal. Moreover, when stamping a circle of radial flange, it is easy to tear the peripheral wall of the terminal body, which increases the difficulty of terminal manufacturing.

SUMMARY

A connector terminal includes a terminal body having a hollow cylindrical part and a plurality of protrusions formed on the hollow cylindrical part, and a supporting component installed on the hollow cylindrical part of the terminal body. The supporting component includes a first circumferential wall, a second circumferential wall coaxial with the first circumferential wall and having a diameter smaller than a diameter of the first circumferential wall, a radial wall radially connected between the first circumferential wall and the second circumferential wall, and a flanging part vertically bent inward from the second circumferential wall. The protrusions are constrained between the first circumferential wall, the radial wall, and the flanging part. The radial wall forms a support step.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EMBODIMENTS

Figure 1:
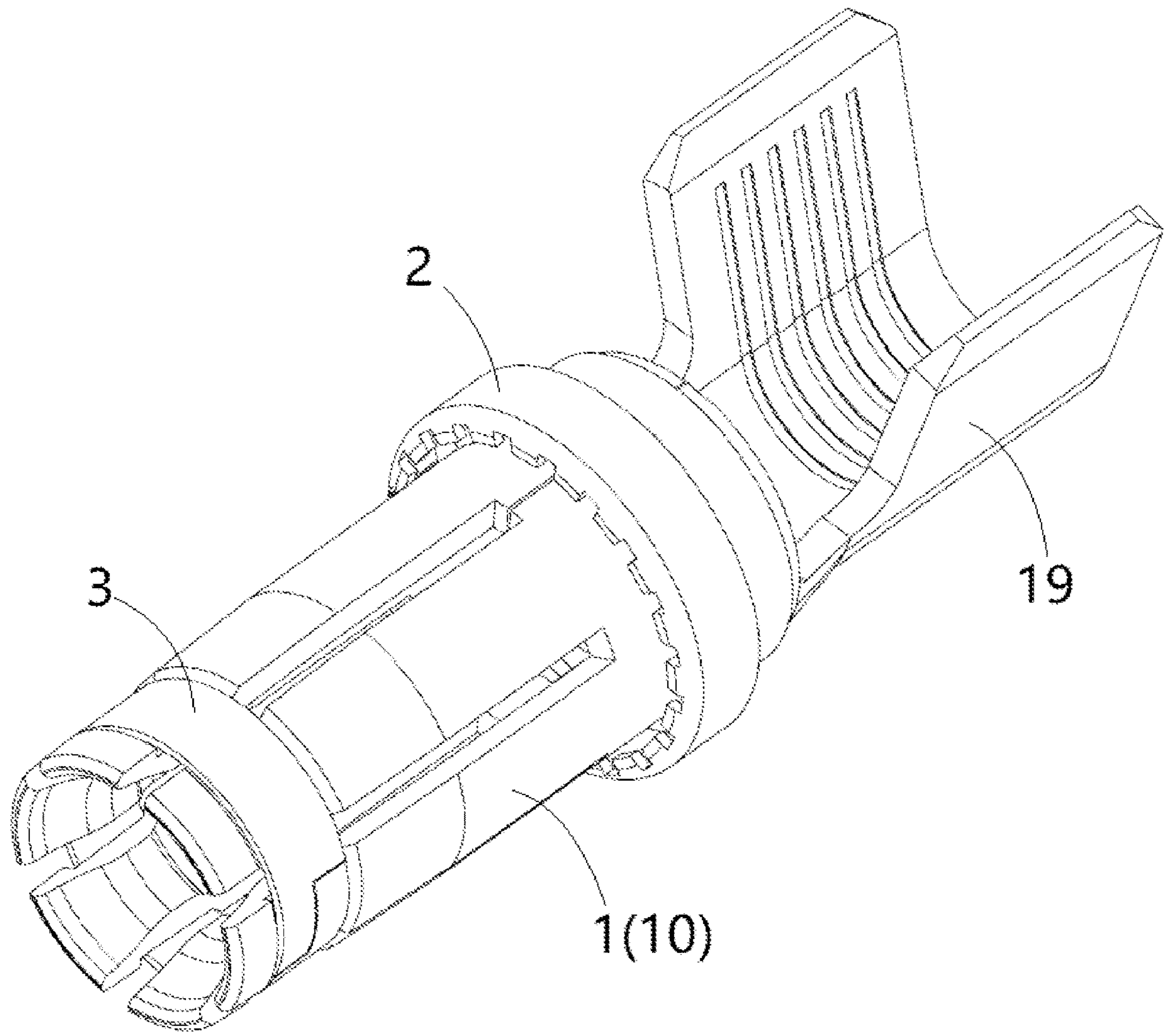
FIG. 1 is a perspective view of a connector terminal according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
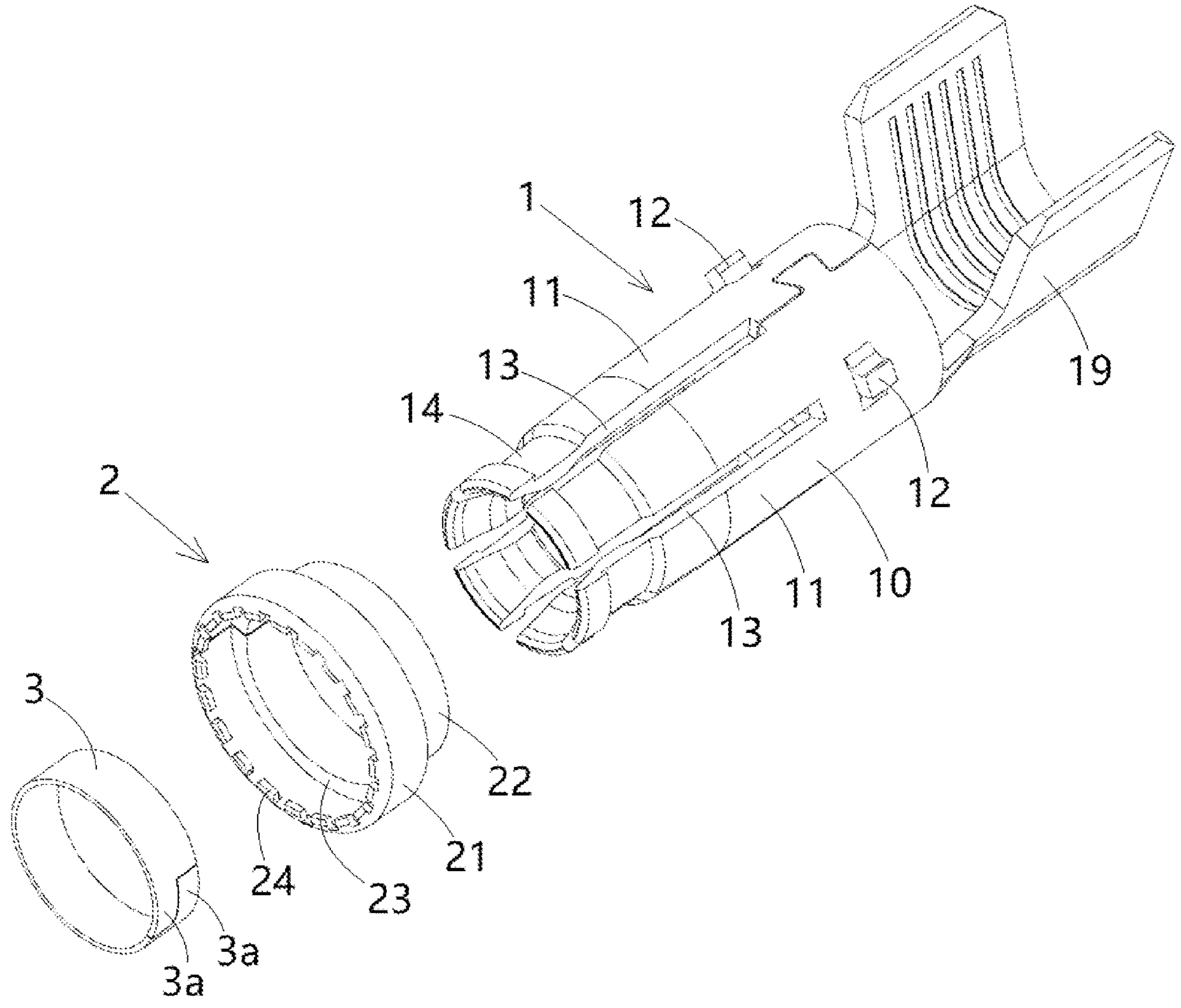
FIG. 2 is an exploded perspective view of the connector terminal.
Figure 3:
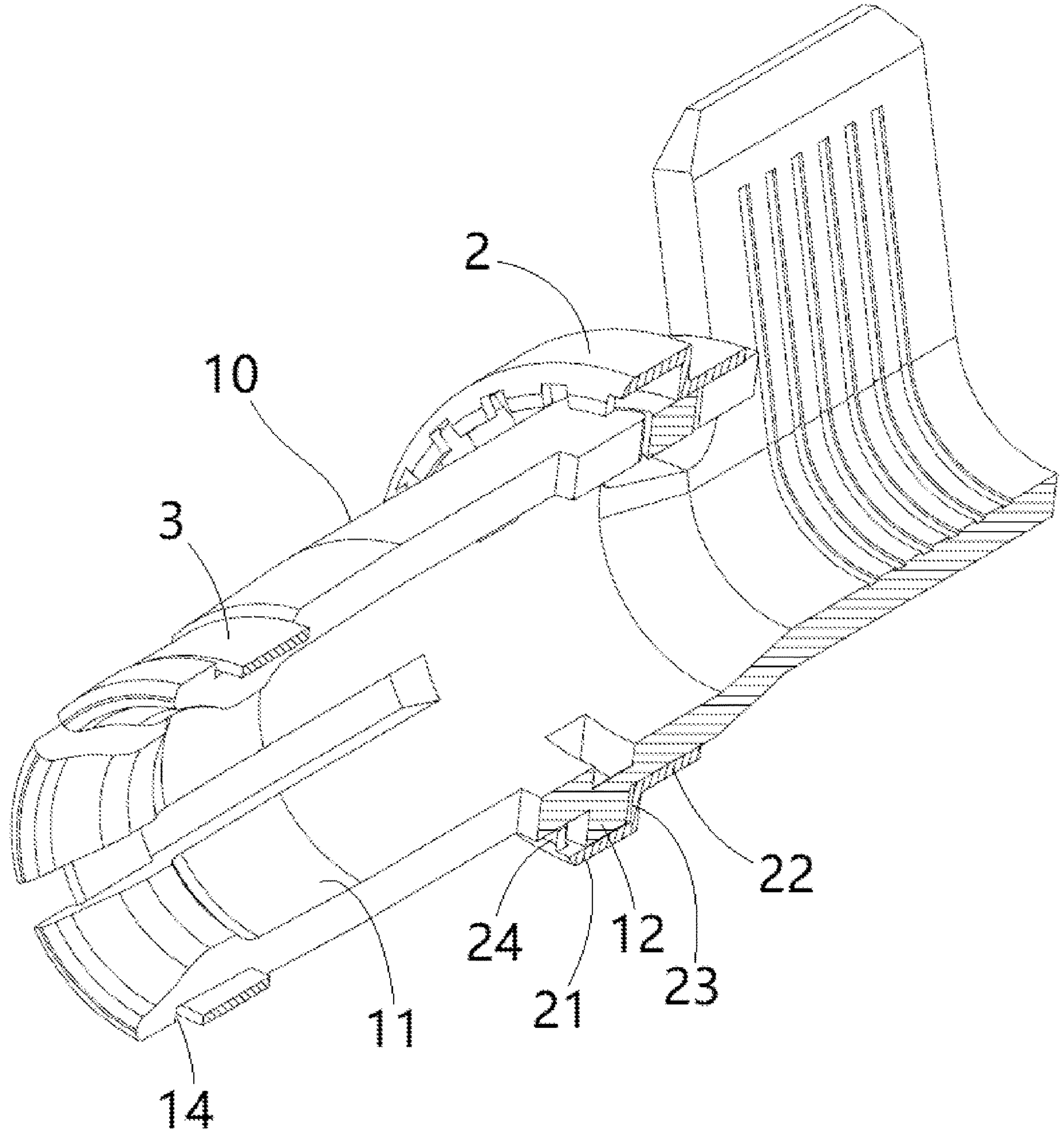
FIG. 3 is a sectional perspective view of the connector terminal.

As shown in FIGS. 1 to 3, in an exemplary embodiment of the present invention, a connector terminal is disclosed. The connector terminal includes a terminal body 1 and a supporting component 2. The terminal body 1 has a hollow cylindrical part 10. The supporting component 2 is installed on the cylindrical part 10 of the terminal body 1.

Figure 5:
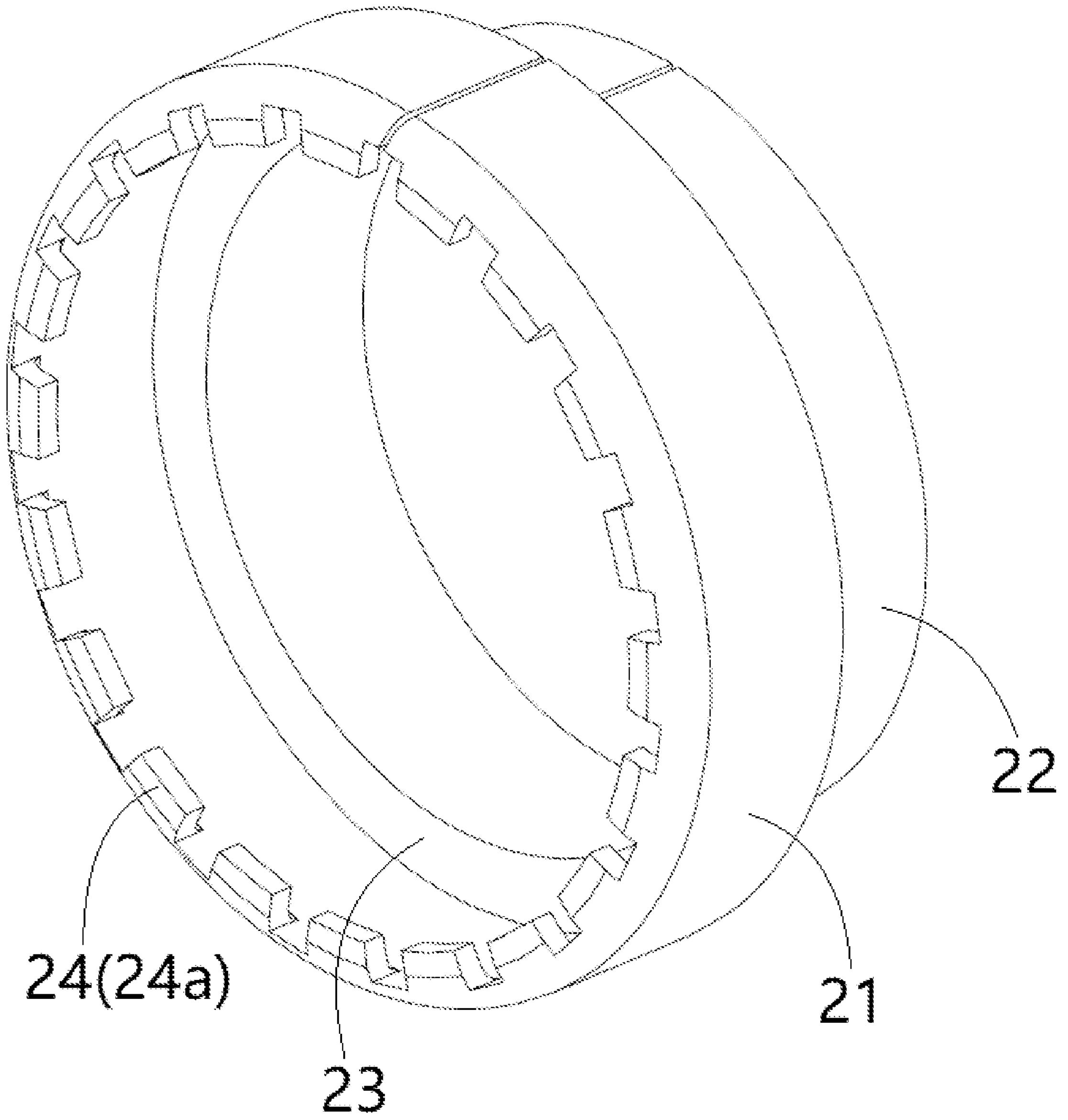
FIG. 5 is a perspective view of a supporting component of the connector terminal.

As shown in FIGS. 2, 3, and 5, in the illustrated embodiment, the supporting component 2 mainly includes: a first circumferential wall 21, a second circumferential wall 22, a radial wall 23, and a flanging part 24. The first circumferential wall 21 has opposite ends in its axial direction. The second circumferential wall 22 is coaxial with the first circumferential wall 21. The second circumferential wall 22 has a diameter smaller than that of the first circumferential wall 21. The radial wall 23 is radially connected between ends of the first circumferential wall 21 and the second circumferential wall 22. The flanging part 24 is vertically bent inward relative to the other end of the second circumferential wall 22.

Figure 4:
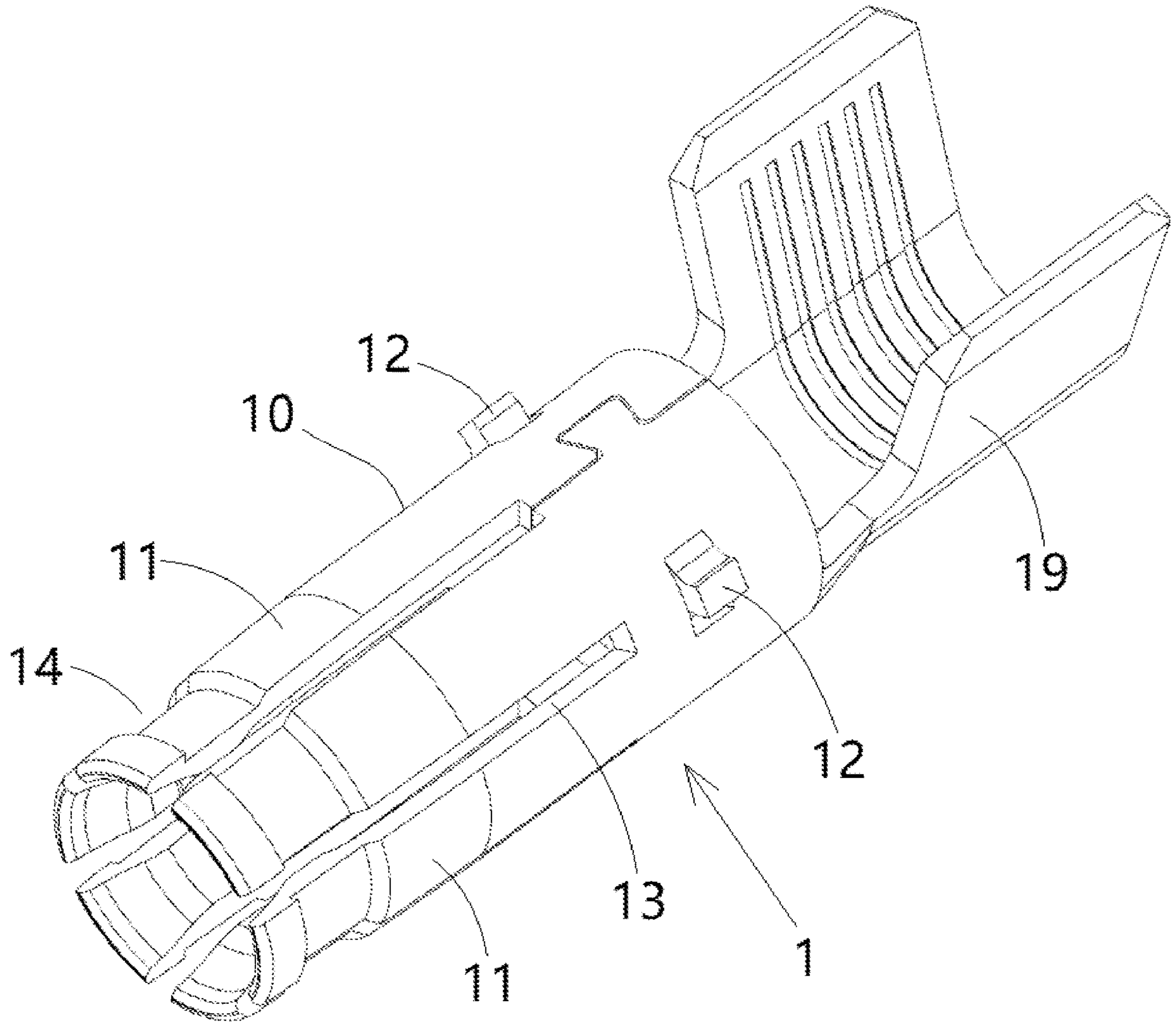
FIG. 4 is a perspective view of a terminal body of the connector terminal.

As shown in FIGS. 2 and 4, in the illustrated embodiment, multiple protrusions 12 are formed on the cylindrical part 10. In the illustrated embodiment, three protrusions 12 are formed on the cylindrical part 10. However, the present invention is not limited to the illustrated embodiment, for example, two, four, five, or more protrusions 12 can be formed on the cylindrical part 10.

In the illustrated embodiments, multiple protrusions 12 are spaced in the circumferential direction of the cylindrical part 10 and constrained between the first circumferential wall 21, the radial wall 23, and the flanging part 24, as shown in FIG. 3, so that the supporting component 2 cannot be detached from the terminal body 1. The radial wall 23 of the supporting component 2 forms a support step for supporting the elastic locking piece inside the connector housing. The elastic locking piece is pressed against the radial wall 23 of the supporting component 2 to prevent the connector terminal from being pulled out of the connector housing. In the illustrated embodiments, the inner diameter of the second circumferential wall 22 is equal to or slightly greater than the outer diameter of the cylindrical part 10, the inner diameter of the first circumferential wall 21 is greater than the inner diameter of the second circumferential wall 22, and the outer diameter of the first circumferential wall 21 is greater than the outer diameter of the second circumferential wall 22.

Figure 6:
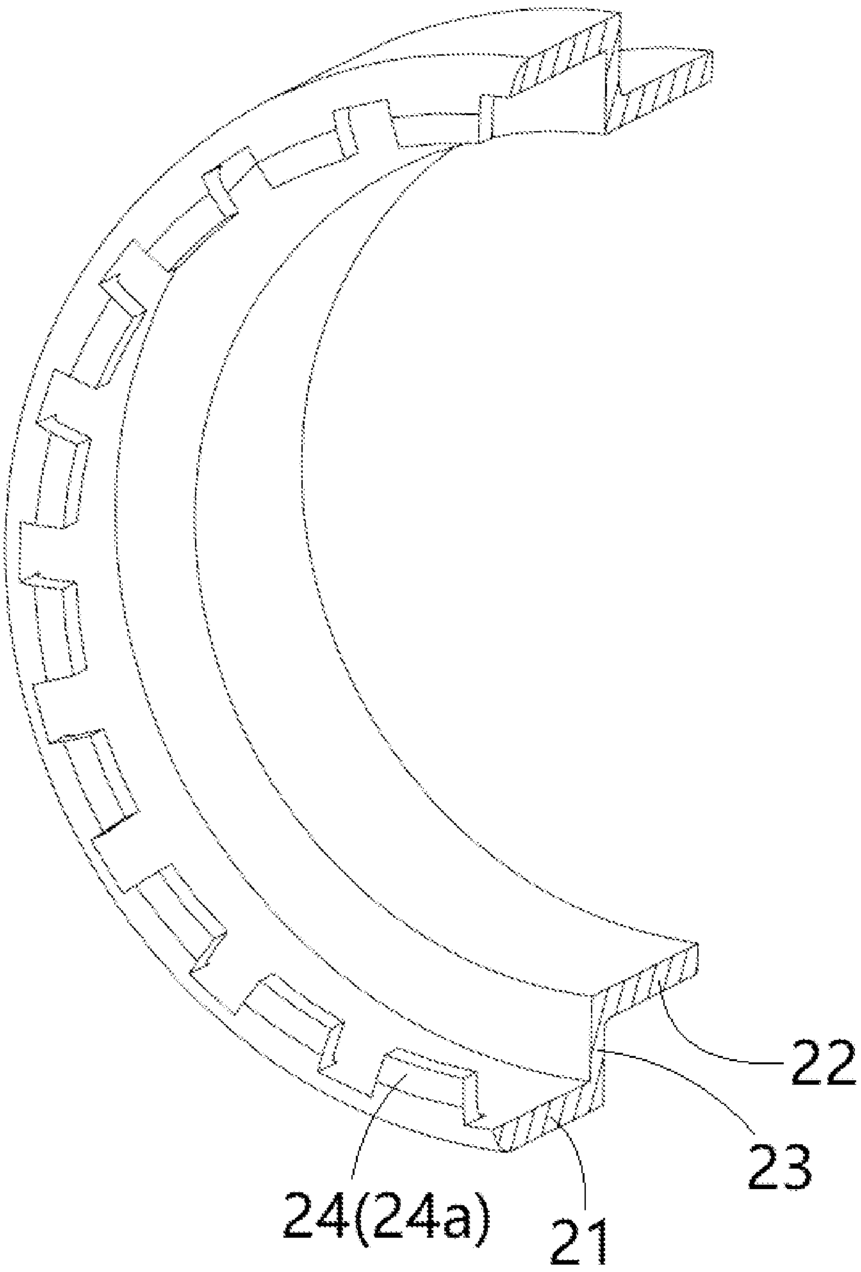
FIG. 6 is a sectional perspective view of the supporting component.

As shown in the embodiment of FIGS. 2, 5, and 6, the flanging part 24 includes multiple toothed parts 24*a*. Multiple toothed parts 24*a* are distributed at intervals along the circumferential direction of the first circumferential wall 21. In the illustrated embodiments, a gap between any two adjacent toothed parts 24*a* in multiple toothed parts 24*a* is smaller than the size of the protrusion 12 in the circumferential direction of the cylindrical part 10, so that the protrusion 12 cannot pass through the gap between any two adjacent toothed parts 24*a*.

In the illustrated embodiments, each of the terminal body 1 and the supporting component 2 is an integral stamped part. This can reduce manufacturing costs and improve manufacturing efficiency.

In the illustrated embodiment, the cylindrical part 10 has a first end and a second end opposite in its axial direction. The protrusion 12 is located near the first end of the cylindrical part 10, and the second end of the cylindrical part 10 is used for electrical contact with a mating terminal of an inserted mating connector.

As shown in FIGS. 1, 2, and 4, in the illustrated embodiment, the terminal body 1 further includes a crimping part 19, which is connected to the first end of the cylindrical part 10 and is adapted to be crimped onto a cable for electrical connection with the cable.

As shown in FIGS. 2 and 4, in the illustrated embodiments, multiple axial grooves 13 are formed on the circumferential wall of the cylindrical part 10, and the multiple axial grooves 13 are spaced in the circumferential direction of the cylindrical part 10 and extend axially to the end face of the second end of the cylindrical part 10 to divide the circumferential wall of the cylindrical part 10 into multiple elastic cantilevers 11. Multiple elastic cantilevers 11 are used for electrical contact with the mating terminal inserted from the opening of the second end of the cylindrical part 10.

As shown in FIGS. 2 and 4, in the illustrated embodiments, a spring groove 14 is formed on the outer surface of the free end of multiple elastic cantilevers 11. The connector terminal also includes a spring coil 3. The spring coil 3 is positioned and installed in the spring groove 14 to provide auxiliary contact force to multiple elastic cantilevers 11. In this way, the electrical contact force between the elastic cantilever 11 and the mating terminal can be increased to ensure reliable electrical contact between the connector terminal and the mating terminal.

As shown in FIG. 2, in the illustrated embodiment, the spring coil 3 has two separated ends 3*a* to allow the spring coil 3 to be radially stretched into a C-shape.

In the aforementioned exemplary embodiments of the present invention, the elastic locking piece is supported by the supporting component 2 installed on the terminal body 1, thereby eliminating the need to form a radial flange on the peripheral wall of the terminal body 1, which reduces the manufacturing difficulty of the terminal and does not affect the conductivity of the terminal.

In another exemplary embodiment of the present invention, a connector is also disclosed. The connector includes a housing; the connector terminal described in detail above installed in the housing, and an elastic locking piece arranged in the housing. The end of the elastic locking piece is pressed against the radial wall 23 of the supporting component 2 of the connector terminal to lock the connector terminal in the housing.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector terminal, comprising:

a terminal body having a hollow cylindrical part and a plurality of protrusions formed on the hollow cylindrical part, the protrusions are spaced in a circumferential direction of the hollow cylindrical part; and a supporting component installed on the hollow cylindrical part of the terminal body, the supporting component includes:

a first circumferential wall having a pair of opposite ends in an axial direction;

a second circumferential wall coaxial with the first circumferential wall and having a diameter smaller than a diameter of the first circumferential wall;

a radial wall radially connected between the first circumferential wall and the second circumferential wall; and a flanging part vertically bent inward from the second circumferential wall at an end of the second circumferential wall opposite the radial wall, the protrusions are constrained between the first circumferential wall, the radial wall, and the flanging part, the radial wall forms a support step.

2. The connector terminal of claim 1, wherein the support step supports an elastic locking piece inside a connector housing and prevents the connector terminal from being pulled out of the connector housing.

3. The connector terminal of claim 1, wherein an inner diameter of the second circumferential wall is equal to or greater than an outer diameter of the hollow cylindrical part.

4. The connector terminal of claim 3, wherein an inner diameter of the first circumferential wall is greater than the inner diameter of the second circumferential wall.

5. The connector terminal of claim 4, wherein an outer diameter of the first circumferential wall is greater than an outer diameter of the second circumferential.

6. The connector terminal of claim 1, wherein the flanging part has a plurality of toothed parts distributed at intervals along the circumferential direction.

7. The connector terminal of claim 6, wherein a gap between a pair of adjacent toothed parts of the plurality of toothed parts is smaller than one of the protrusions in the circumferential direction.

8. The connector terminal of claim 1, wherein the terminal body is an integral stamped part.

9. The connector terminal of claim 8, wherein the supporting component is an integral stamped part.

10. The connector terminal of claim 1, wherein the hollow cylindrical part has a first end and a second end opposite to the first end in the axial direction, the protrusions are adjacent to the first end, the second end is electrically connectable with a mating terminal.

11. The connector terminal of claim 10, wherein the terminal body includes a crimping part connected to the first end of the hollow cylindrical part, the crimping part is crimpable onto a cable.

12. The connector terminal of claim 10, wherein a circumferential wall of the hollow cylindrical part has a plurality of axial grooves that are spaced apart in the circumferential direction.

13. The connector terminal of claim 12, wherein the axial grooves extend axially to an end face of the second end of the hollow cylindrical part and divide the circumferential wall into a plurality of elastic cantilevers.

14. The connector terminal of claim 13, wherein the elastic cantilevers electrically contact the mating terminal inserted into the second end of the hollow cylindrical part.

15. The connector terminal of claim 14, wherein each of the elastic cantilevers has a spring groove on an outer surface at a free end of the elastic cantilever.

16. The connector terminal of claim 15, further comprising a spring coil positioned and installed in the spring groove and providing an auxiliary contact force to the elastic cantilevers.

17. The connector terminal of claim 16, wherein the spring coil has a pair of separated ends allowing the spring coil to be radially stretched into a C-shape.

18. A connector, comprising:

a housing;

a connector terminal installed in the housing, the connector terminal includes:

a terminal body having a hollow cylindrical part and a plurality of protrusions formed on the hollow cylindrical part, the protrusions are spaced in a circumferential direction of the hollow cylindrical part; and a supporting component installed on the hollow cylindrical part of the terminal body, the supporting component includes:

a first circumferential wall having a pair of opposite ends in an axial direction;

a second circumferential wall coaxial with the first circumferential wall and having a diameter smaller than a diameter of the first circumferential wall;

a radial wall radially connected between the first circumferential wall and the second circumferential wall; and a flanging part vertically bent inward from the second circumferential wall at an end of the second circumferential wall opposite the radial wall, the protrusions are constrained between the first circumferential wall, the radial wall, and the flanging part, the radial wall forms a support step; and an elastic locking piece arranged in the housing, an end of the elastic locking piece is pressed against the radial wall to lock the connector terminal in the housing.

* * * * *